United States Patent [19]

Uchida et al.

[11] Patent Number: 5,054,089
[45] Date of Patent: Oct. 1, 1991

[54] INDIVIDUAL IDENTIFICATION APPARATUS

[75] Inventors: Satoshi Uchida; Masahiro Takeda, both of Kanagawa, Japan

[73] Assignee: Kabushiki Kaisha Toshiba, Kawasaki, Japan

[21] Appl. No.: 451,873

[22] Filed: Dec. 18, 1989

[30] Foreign Application Priority Data

Dec. 29, 1988 [JP] Japan .................. 63-330915

[51] Int. Cl.$^5$ .............................. G06K 9/00
[52] U.S. Cl. ........................... 382/4; 382/5; 382/18; 356/71
[58] Field of Search ............... 356/71; 382/4, 5, 44, 382/48, 18

[56] References Cited

U.S. PATENT DOCUMENTS

| | | | |
|---|---|---|---|
| 4,569,080 | 2/1986 | Schiller | 382/4 |
| 4,635,293 | 1/1987 | Watanabe | 382/44 |
| 4,688,088 | 8/1987 | Hamazaki et al. | 358/101 |
| 4,805,223 | 2/1989 | Denyer | 382/4 |

Primary Examiner—David K. Moore
Assistant Examiner—Dan Santos
Attorney, Agent, or Firm—Oblon, Spivak, McClelland, Maier & Neustadt

[57] ABSTRACT

An apparatus for identifying an individual includes a reader for reading the input image of a finger of the individual and outputting an image signal corresponding to the image of the finger, an adder for adding the image signal output from the reader in a direction perpendicular to a longitudinal direction of the finger and outputting an addition signal, and a memory such as an IC card for storing a previously registered addition signal output from the adder. A first signal obtained by decimation of the addition signal from the adder and a second signal obtained by the decimation of the addition signal stored in the IC card are roughly position aligned. After the rough position alignment, two addition signals, in which one is the addition signal before obtaining the first signal and the other is the addition signal before obtaining the second signal, are accurately position aligned. The two addition signals are then compared to decide whether the finger image corresponds to an authorized person.

11 Claims, 6 Drawing Sheets

INDIVIDUAL IDENTIFICATION APPARATUS

BACKGROUND OF THE INVENTION

1. Field of the Invention

The present invention relates to an individual identification apparatus for identifying an individual.

2. Description of the Related Art

An individual identification apparatus for identifying an individual using an addition signal gained by adding up finger-image densities in the direction perpendicular to the longitudinal direction of a finger is disclosed in U.S. patent application No. 364,197, which was filed by the present applicants and is now pending. In this individual identification apparatus, identification of an individual is performed by position alignment between the addition signal obtained by adding up finger-image densities derived from the difference between the contact and non-contact of the finger placed on the finger rest, and an addition signal that has been previously registered in a dictionary, followed by comparison of these two addition signals.

This position alignment processing is performed by calculating the squared error of the two addition signals whilst displacing one addition signal.

However, the accuracy of identification of such an individual identification apparatus is unsatisfactory, and position alignment takes a long time.

SUMMARY OF THE INVENTION

It is an object of the present invention to provide an individual identification apparatus which has high identification accuracy and wherein position alignment can be performed in a short time.

According to the present invention, an apparatus for identifying an individual by scanning his or her finger comprises means for generating an input image of the finger and outputting an image signal corresponding to the input image of the finger; means for adding the image signal output from the generating means in a direction perpendicular to a longitudinal direction of the finger and outputting an additional signal; means for storing a previously registered addition signal output from the adding means; rough position alignment means for performing a rough position alignment between a first signal obtained by the decimation of the addition signal output from the adding means and a second signal obtained by the decimation of the addition signal stored in the storing means; accurate position alignment means for performing an accurate position alignment after the rough position alignment by using the output addition signal and the stored addition signal without decimation of either signal; and means for comparing the output and stored addition signals after the accurate position alignment has been performed.

Further, according to the present invention, an apparatus for identifying an individual by scanning his or her finger comprises means for generating an input image of the finger and outputting an image signal corresponding to the input image of the finger; means for adding the image signal output from the generating means in a direction perpendicular to a longitudinal direction of the finger and outputting an addition signal; means for limiting the frequency band of the addition signal output from the adding means and outputting the limited signal; means for storing a previously registered signal output from the limiting means; and means for comparing the previously registered stored signal and the limited signal output by the limiting means.

DETAILED DESCRIPTION OF THE PREFERRED EMBODIMENTS

Referring to the accompanying drawings, a detailed description will subsequently be given of the preferred embodiment of the present invention.

Figure 1:
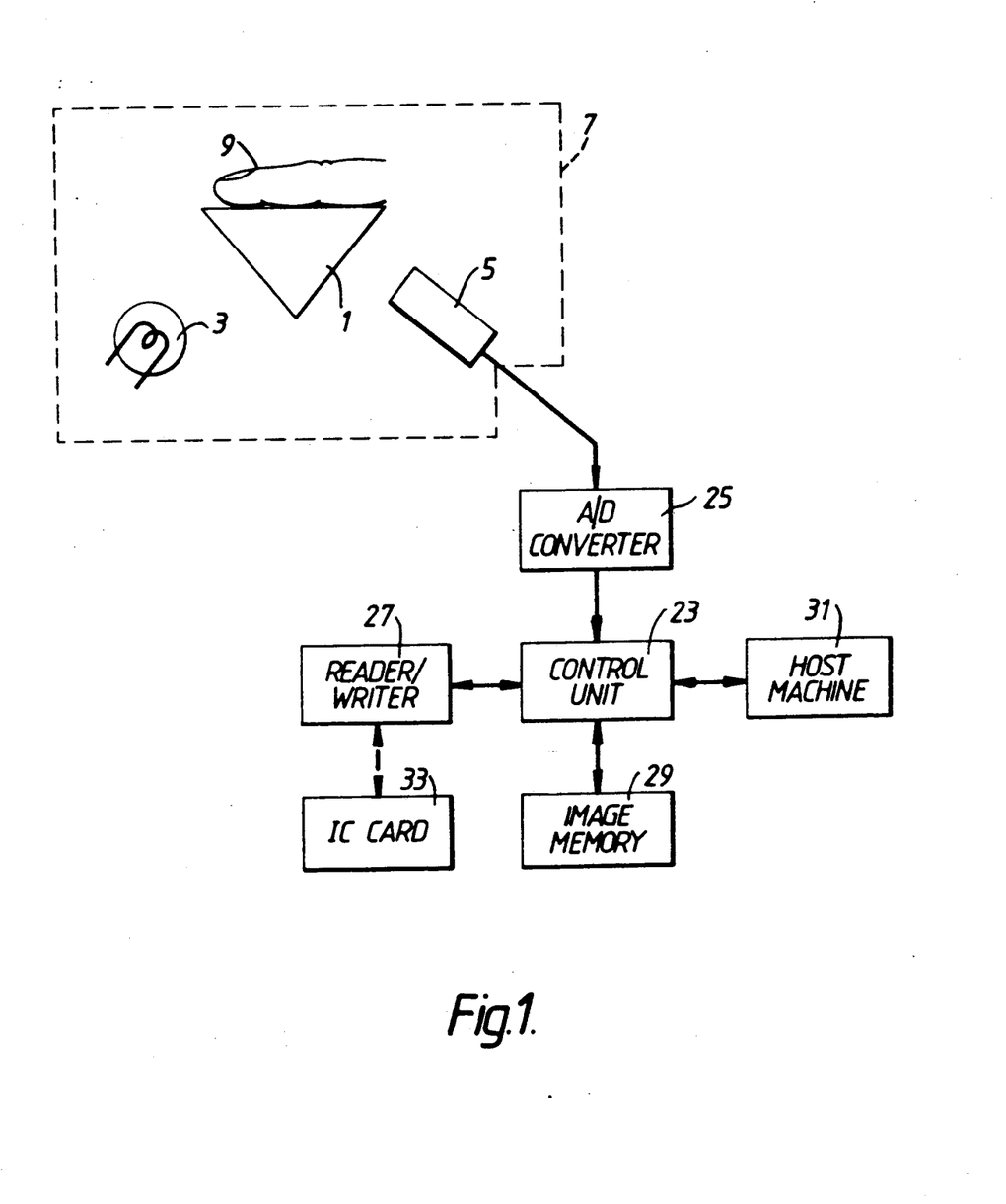
FIG. 1 is a block diagram showing an embodiment of an individual identification apparatus according to the present invention.

FIG. 1 is a block diagram showing the layout of an individual identification apparatus according to the present invention.

The individual identification apparatus comprises a right-angled equilateral prism 1 whereby a finger image produced by the difference between the contact and non-contact of a finger 9 is obtained; an illumination unit 3 that directs light on to this right-angled equilateral prism 1; a television camera 5 that converts the finger image that is obtained into an electrical signal; an A/D converter 25 that converts this electrical signal into digital quantities; an image memory 29 in which the digital finger image obtained by A/D converter 25 is stored; a control unit 23 that executes the core processing, such as comparison etc; and a reader/writer 27 that writes the addition signal of each of the persons being identified in IC card 33, and that performs the opposite action, namely, reading from IC card 33. Host machine 31 controls, for example, door opening and closing or sounding of an alarm buzzer etc. in accordance with the signal from control unit 23. The subject of the control executed by host machine 31 will depend on the security system in which this individual identification apparatus is employed.

The flow of processing of this individual identification apparatus will now be described. Identification can be broadly divided into two processes, namely, "registration" and "verification". Registration will be described first.

REGISTRATION

Figure 3:
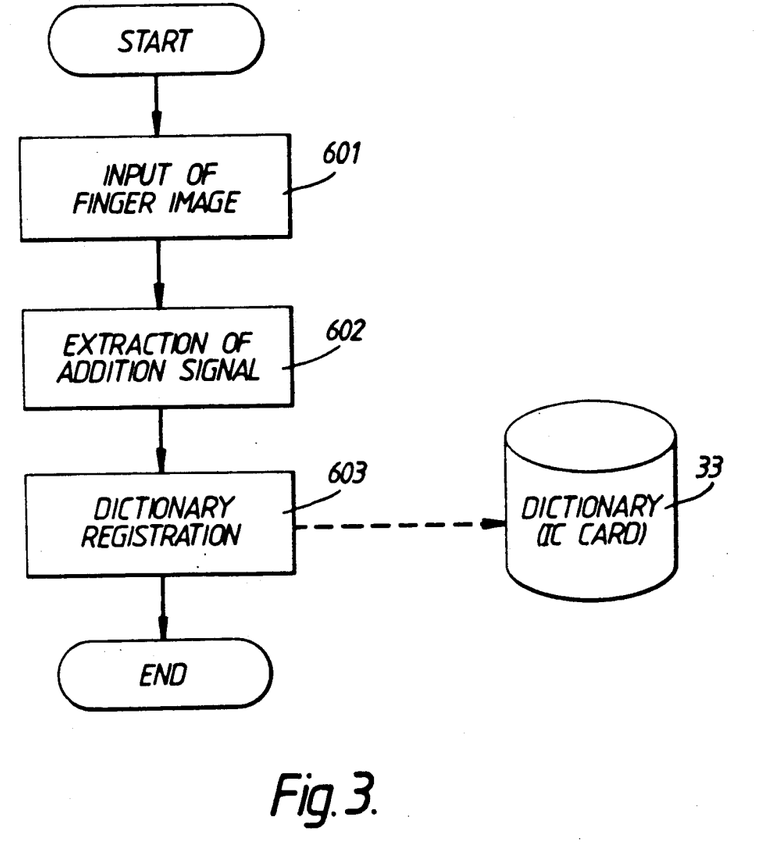
FIGS. 3 and 4 are flow charts showing the operation of a first embodiment of the present invention.

The flow of registration processing is shown in FIG. 3. First of all, the finger image is picked up by read unit 7 (Step 601), and an addition signal is extracted (Step 602) by density addition of this finger image in the direction perpendicular to the longitudinal direction of the finger.

Figure 2:
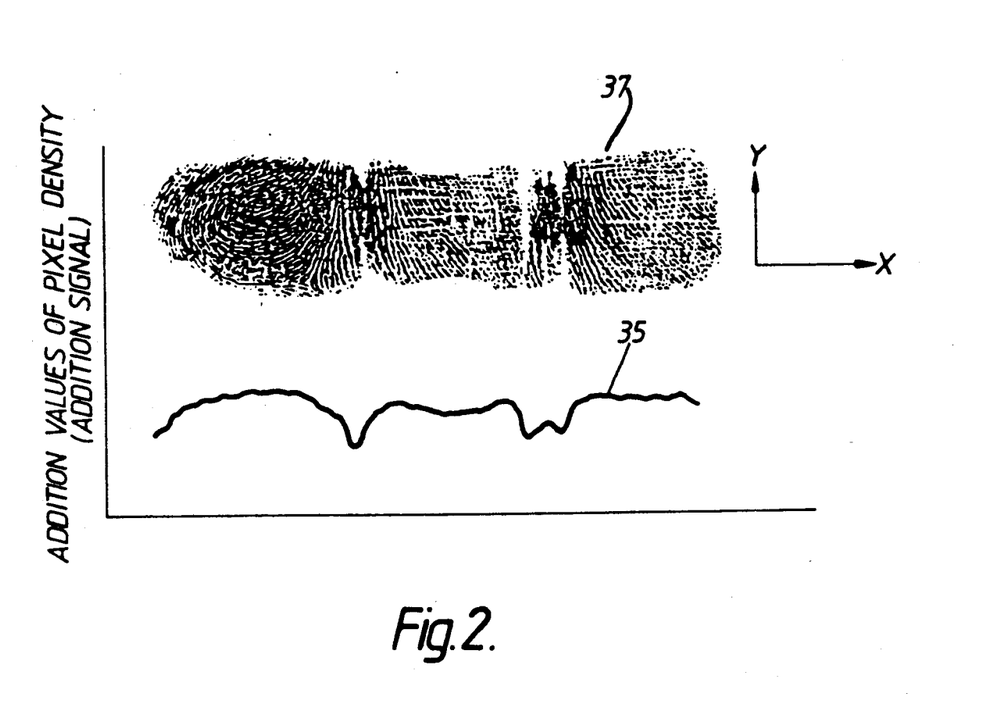
FIG. 2 is a view showing the finger image and addition signal obtained by the individual identification apparatus.

FIG. 2 shows the finger image and the resulting addition signal. As shown in this FIG. 2, addition signal 35 is obtained by addition of pixel densities of finger image 37 in the direction y perpendicular to the longitudinal direction x of the finger. This addition signal 35 has sharp dips at the position of the transverse folds corresponding to the joints of the finger.

Next, this addition signal is registered in the dictionary (Step 603). This dictionary includes IC card 33 of the persons who are the subjects of identification.

VERIFICATION

Figure 4:
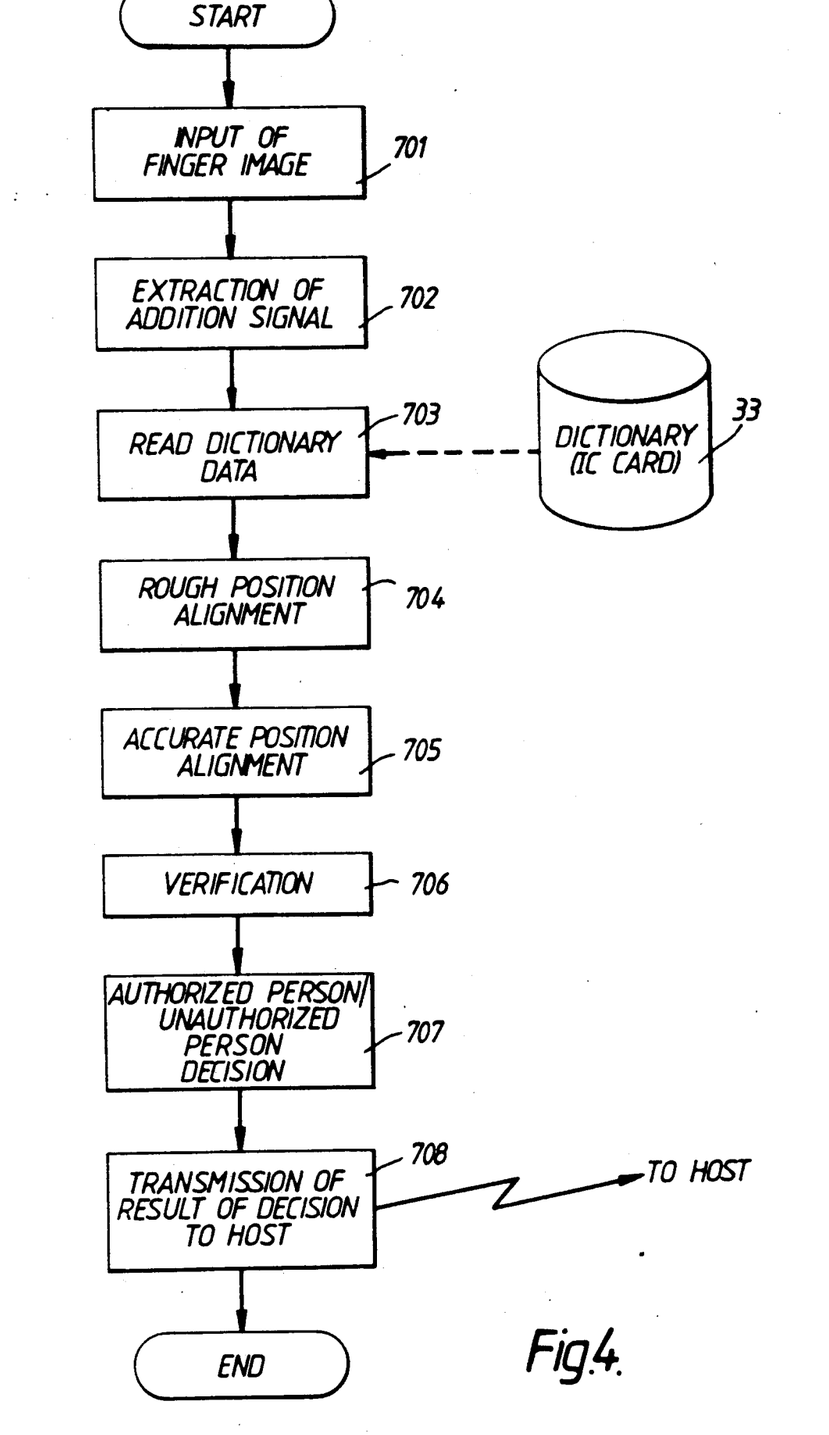

The flow of verification processing is shown in FIG. 4. The input of the finger image and extraction of the addition signal in Step 701 and Step 702 is by the same processing as during registration. Next, the addition signal that is registered beforehand in the dictionary (IC card 33) is read out (Step 703), and a rough position alignment (Step 704) is made between the read addition signal and the addition signal found from the finger image that is input.

(a) ROUGH POSITION ALIGNMENT

As an example, assume the addition signal that is read from the dictionary is Ad(i), the addition signal found from the input finger image is A(i), and the number of elements of each addition signal is N. Also, assume the signal obtained by the decimation or thinning of Ad(i) at 1/L decimation is Ad'(i), and the signal obtained by the decimation of A(i) at 1/L is A'(i). Further, assume the result of summing, over a given range, the squared error between Ad'(i) and A'(i+m) (displaced by m) is S'(m). The 1/L denotes a selected decimation rate.

When $m \geq 0$, $$S'(m) = (1/(N/L - m)) \cdot \sum_{i=1}^{N/L-m} \{A'(i + m) - Ad'(i)\}^2 \quad (1)$$

when $m < 0$, $$S'(m) = (1/(N/L + m)) \cdot \sum_{i=-m+1}^{N/L} \{A'(i + m) - Ad'(i)\}^2 \quad (2)$$

S'(m) is the parameter that expresses the degree of agreement between A'(i+m) and Ad'(i). The agreement is better the smaller the value of S'(m). For the rough position alignment, m is varied within a certain range. Rough position alignment is taken as having been achieved at M' when the final value of S'(m) is smallest.

Next, accurate position alignment is performed (Step 705).

(b) ACCURATE POSITION ALIGNMENT

When the rough position alignment described above has been completed, the result obtained still includes an error of between $-L/2$ and $L/2$. In order to correct for this, accurate position alignment is performed by calculating S(m) expressed by the following equation, from the addition signal Ad(i) which is read from the dictionary in the same way as in (a), and the addition signal A(i) that is found from the input finger image.

When $m \geq 0$, $$S(m) = (1/(N - m)) \cdot \sum_{i=1}^{N-m} \{A(i + m) - Ad(i)\}^2 \quad (3)$$

when $m < 0$, $$S(m) = (1/(N + m)) \cdot \sum_{i=-m+1}^{N} \{A(i + m) - Ad(i)\}^2 \quad (4)$$

The range for which m is varied should be:

$$M' - L/2 \leq m \leq M' + L/2 \quad (5)$$

This is because the error in the position alignment in the rough position alignment of (a) is between $-L/2$ and $L/2$. It is then taken that position alignment has been achieved at M when the value of S(m) is smallest. Its value at this time, S(M), is taken as the result of the verification (Step 706).

Finally, a decision is made (Step 707) as to whether the person is to be regarded as authorized or not. This decision as to whether the person is to be regarded as authorized or not is made by determining a threshold value TH beforehand for personal identification discrimination, and deciding whether the person is to be regarded as authorized or not on the basis of whether this threshold value TH of S(M) is exceeded or not. That is, if $S(m) \leq TH$—A decision is made that the person is authorized;

$S(m) > TH$—A decision is made that the person is not authorized.

The result of this decision is transmitted to the host machine 31 (Step 708). This host machine 31 carries out processing depending on the result of the decision. For example, if the decision is that the person is an authorized person, it would release a door etc, and, if the decision is that the person is an unauthorized person, it would perform processing to sound an alarm buzzer etc. Such processing will depend on the security system to which this individual identification apparatus is applied.

A comparison of the processing speed of this embodiment and the prior art example is performed using the number of times of multiplication.

In the case of the prior art position alignment, rough position alignment is not carried out. Instead, m is varied within a given range from the begining, using equations (3) and (4). Now, if the range in which m is varied is taken as $\pm M$, and the number of elements of the addition signal is taken as N, the number of times of multiplication Nm' required in the prior art position alignment method may be expressed by the following equation, from the formula for the sum of an arithmetical series.

$$Nm' = (M+1)(2N-M)-N \quad (6)$$

In contrast, the number of times of multiplication in this embodiment of the invention i.e. Nm may be represented by:

$$Nm = (M/L+1)(2N-M)/L - N/L + (L/2+1)(2N-L/2) - N \quad (7)$$

Where 1/L is the decimation rate. In equation (7), the first term and the second term are the number of times multiplication is required for the rough position alignment, and the third term and the fourth term are the number of times multiplication is required for the subsequent position alignment.

Using actually obtained experimental values, we found the ratio Nm/Nm' of these numbers of multiplication. In the experiment, the resolution of the input image was 10 pixel/mm, the number N of elements of the addition signal was N=400 (4 cm), the range over which m was varied was M = 100 (+1 cm), and the decimation rate 1/L was ¼. The ratio of the number of multiplications was calculated by inserting these values in equations (6) and (7). The result obtained was 0.092. Thus, it can be seen that this embodiment is more than ten times faster than the prior art.

Thus, with the first embodiment, the amount of calculation is decreased, and high speed processing is made possible, by performing a two-step position alignment in which the addition signal is decimated and a rough position alignment is performed, then an accurate position alignment is performed.

Next, a second embodiment will be described. The hardware construction of the second embodiment is the same as shown in FIG. 1, but the control operation of control unit 23 is different.

The operation of this embodiment will now be described, concentrating mainly on the control action of the control unit 23.

REGISTRATION

Figure 5:
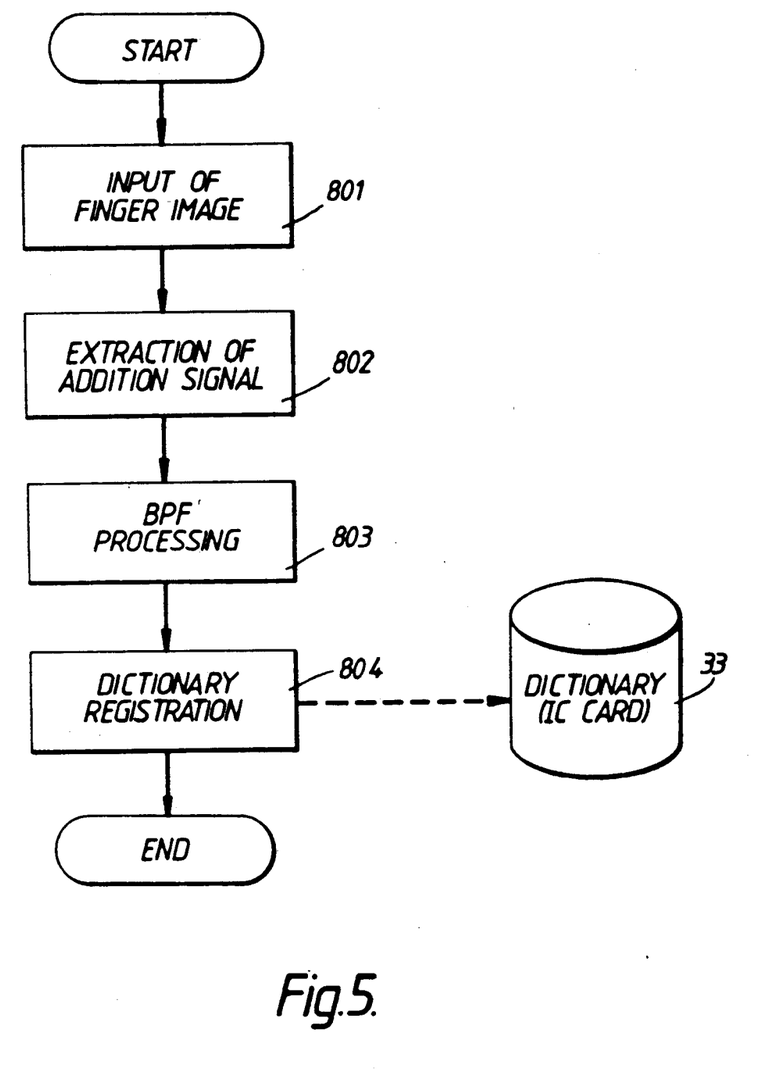
FIGS. 5 and 6 are flow charts showing the operation of a second embodiment of the present invention.

The flow of registration processing is shown in FIG. 5. First of all, a finger image is picked up (Step 801), and an addition signal is extracted (Step 802) by calculating the density of this finger image in the direction perpendicular to the longitudinal direction of the finger. Next, BPF (Band Pass Filtering) processing is performed on the addition signal (Step 803), in order to remove the effect of fluctuation is the way in which the finger is placed, and/or of fine lines on the finger. Fluctuation due to the manner of placing the finger have only extremely low frequency components, and oscillations due to fine lines on the finger have only extremely high frequency components. The effect of both these two can therefore be removed by performing BPF processing having suitable cut-off frequencies. Finally, the addition signal that has been subjected to the BPF processing is registered in the dictionary (IC card 33) (Step 804).

VERIFICATION

Figure 6:
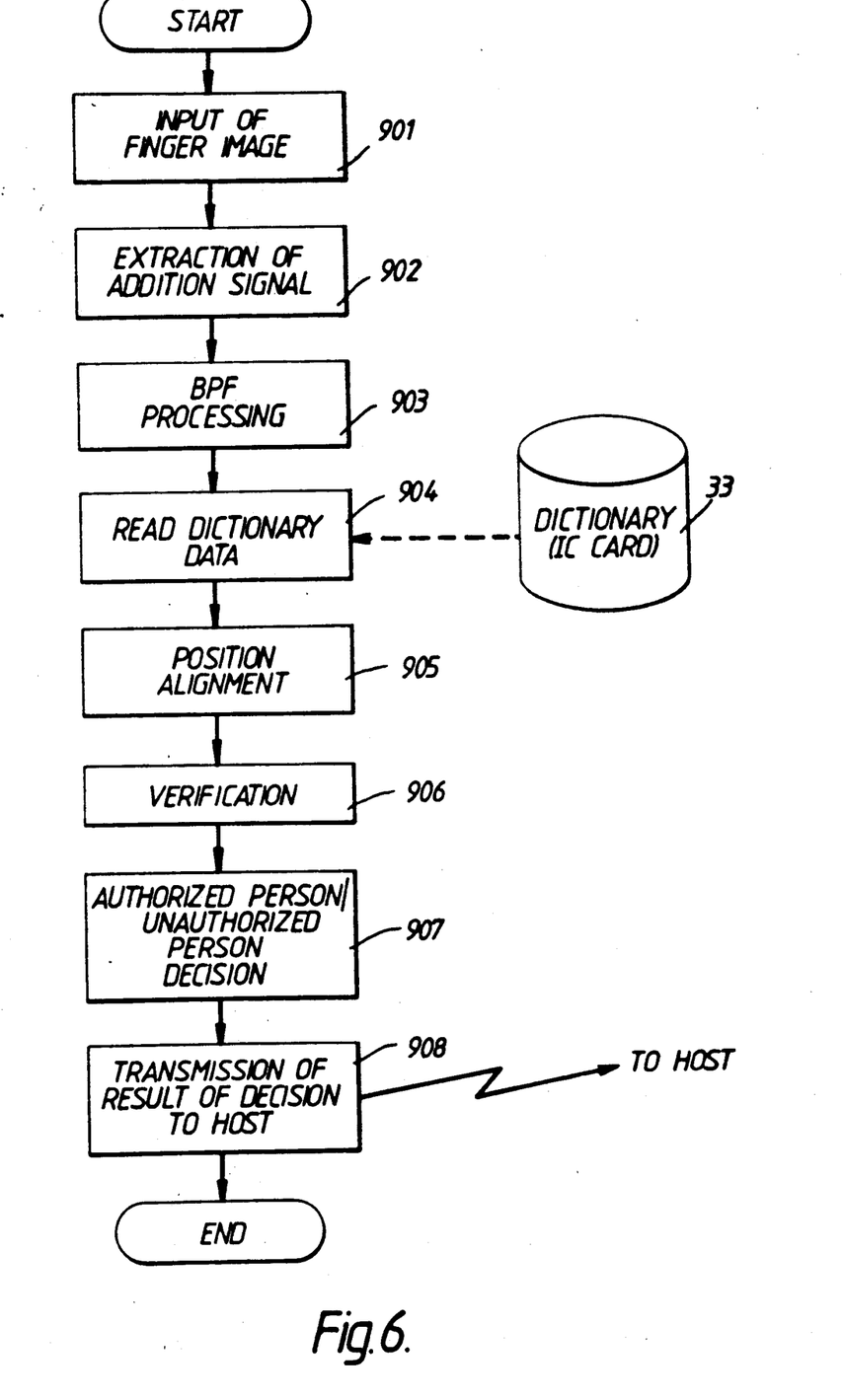

The flow of processing of verification is shown in FIG. 6. Finger image input, extraction of the addition signal and BPF processing in Steps 901 to 903 are performed in the same way as in registration. Next, the addition signal that was registered beforehand in the dictionary (IC card 33) is read out (Step 904), and position alignment is performed with the addition signal found from the addition signal read out from this dictionary and the addition signal found from the input image (Step 905).

Now, let us take it that the addition signal read out from dictionary is Ad(i), the addition signal that has been subjected to BPF processing found from the finger image that is input is A(i) and the number of elements of each addition signal is N. Also, let us take it that the sum of the squared errors over a given range Ad(i) to A(i+m), i.e. a displacement of m, is S(m).

When $m \geq 0$, $$S(m) = (1/(N - m)) \cdot \sum_{i=1}^{N-m} \{A(i + m) - Ad(i)\}^2 \quad (8)$$

when $m < 0$, $$S(m) = (1/(N + m)) \cdot \sum_{i=-m+1}^{N} \{A(i + m) - Ad(i)\}^2 \quad (9)$$

S(m) is the parameter that expresses the degree of agreement between A(i+m) and Ad(i). The smaller the value of S(m), the better is the agreement. Position alignment is taken as being the position alignment at the location M for which the value of S(m) is smallest, obtained by varying m over a given range. The value S(M) at this point is then taken as the result of the verification (Step 906).

Next, a decision is made, in the same way as described above, as to whether the person is an authorized person/unauthorized person (Step 907). This decision as to whether the person is to be regarded as authorized or not is made by determining a threshold value TH beforehand for personal identification discrimination, and deciding whether the person is to be regarded as authorized or not on the basis of whether this threshold value TH of S(M) is exceeded or not. That is, if S(m)≦TH—A decision is made that the person is authorized;

S(m)>TH—A decision is made that the person is not authorized.

The result of this decision is transmitted to host machine 31 (Step 908), and host machine 31 carries out processing in accordance with the result of the decision.

Thus, with the second embodiment, by limiting the frequency band of the addition signal, noise due to difference in the manner of positioning the finger on the finger positioning base (right-angle equilateral prism 1), or due to fine lines on the finger, can be removed. Thus, the accuracy of identification is improved.

As described above, with the present invention, an individual identification apparatus can be provided whereby identification can be achieved with high accuracy and position alignment can be performed in a short time.

What is claimed is:

1. An apparatus for identifying an individual by scanning a finger, comprising:
   means for generating an input image of the finger including at least two image portions each corresponding to joints of the finger and outputting an image signal corresponding to the input image of the finger;
   means for adding the image signal output from the generating means in a direction perpendicular to a longitudinal direction of the finger and outputting an addition signal;
   means for storing a previously registered addition signal output from the adding means;
   rough position alignment means for performing a rough position alignment between a first signal obtained by decimation of the addition signal output from the adding means and a second signal obtained by the decimation of the addition signal stored in the storing means;
   accurate position alignment means for performing an accurate position alignment after the rough position alignment by using the output addition signal and the store addition signal without decimation of either signal; and
   means for comparing the output addition signal with the stored addition signal after the accurate position alignment has been performed.

2. The apparatus of claim 1 wherein the rough position alignment means includes means for obtaining a parameter S'(m) expressing the degree of agreement between the first and second signals by using the following equations whereby rough position alignment is considered complete when the parameter S'(m) is smallest:

when $m \geq 0$, $$S'(m) = (1/(N/L - m)) \cdot \sum_{i=1}^{N/L-m} \{A'(i + m) - Ad'(i)\}^2$$

when $m < 0$, $$S'(m) = (1/(N/L + m)) \cdot \sum_{i=-m+1}^{N/L} \{A'(i + m) - Ad'(i)\}^2$$

wherein N is the number of elements of each additional signal, 1/L is a decimation rate, m is a quantity of displacement, Ad'(i) is a signal obtained by the 1/L decimation of the addition signal in the storing means, and A'(i) is a signal obtained by the 1/L decimation of the addition signal output from the adding means.

3. The apparatus of claim 2 wherein the accurate position alignment means includes means for obtaining a parameter S(m) expressing the degree of agreement between the addition signal, Ad(i), in the storing means and the addition signal, A(i), output from the adding means by the following equations whereby accurate position alignment is considered complete when the parameter S(m) is smallest:

when $m \geq 0$, $$S(m) = (1/(N - m)) \cdot \sum_{i=1}^{N-m} \{A(i + m) - Ad(i)\}^2$$

when $m < 0$, $$S(m) = (1/(N + m)) \cdot \sum_{i=-m+1}^{N} \{A(i + m) - Ad(i)\}^2.$$

4. The apparatus of claim 3 wherein the comparing means includes means for deciding whether the finger image belongs to an authorised person by a comparison of the smallest value of parameter S(m) obtained by the accurate position alignment means and a threshold value TH.

5. The apparatus of claim 1 wherein the storing means includes an IC card.

6. An apparatus for identifying an individual by scanning a finger, comprising:
   means for generating an input image of the finger including at least two image portions each corresponding to joints of the finger and outputting an image signal corresponding to the input image of the finger;
   means for adding the image signal output from the generating means in a direction perpendicular to a longitudinal direction of the finger and outputting an addition signal;
   means for limiting the frequency band of the addition signal output from the adding means and outputting the limited signal;
   means for storing a previously registered signal output from the limiting means; and
   means for comparing the previously registered stored signal with the limited signal output by the limiting means.

7. The apparatus of claim 6 wherein the comparing means includes means for position aligning the previously registered limited signal in the storing means and the limited signal output from the limiting means.

8. The apparatus of claim 7 wherein the position aligning means includes means for obtaining parameter S(m) expressing the degree of agreement between the addition signal, Ad(i), in the storing means and the addition signal, A(i), output from the limiting means by the following equations whereby position alignment is considered complete when the parameter S(m) is smallest:

when $m \geq 0$, $$S(m) = (1/(N - m)) \cdot \sum_{i=1}^{N-m} \{A(i + m) - Ad(i)\}^2$$

when $m < 0$, $$S(m) = (1/(N + m)) \cdot \sum_{i=-m+1}^{N} \{A(i + m) - Ad(i)\}^2$$

9. The apparatus of claim 8 wherein the comparing means includes means for deciding whether the finger image belongs to an authorised person by a comparison of the smallest value of parameter S(m) obtained by the position alignment means and a threshold value TH.

10. The apparatus of claim 6 wherein the storing means includes an IC card.

11. An apparatus for identifying an individual by scanning a finger, comprising:
   means for generating an input image of the finger including at least two image portions each corresponding to joints of the finger and outputting an image signal corresponding to the input image of the finger;
   means for adding the image signal output from the generating means in a direction perpendicular to a longitudinal direction of the finger and outputting an addition signal;
   means for storing a previously registered addition signal output from the adding means;
   rough position alignment means for performing a rough position alignment between the addition signal output from the adding means and the addition signal stored in the storing means;
   accurate position alignment means for performing an accurate position alignment after the rough position alignment by using the addition signal output from the adding means and the addition signal stored in the storing means;
   means for comparing the output addition signal with the stored addition signal after the accurate position alignment has been performed; and
   means for deciding whether the finger image belongs to an authorized person by using the compared result obtained by the comparing means.

* * * * *